Patented Mar. 28, 1950

2,501,692

UNITED STATES PATENT OFFICE 2,501,692

AQUEOUS EMULSION POLYMERIZATION OF ETHYLENIC UNSATURATES IN THE PRESENCE OF DIAZO-THIO-ETHERS

William B. Reynolds and Ernest W. Cotten, Cincinnati, Ohio, assignors to Phillips Petroleum Company, a corporation of Delaware No Drawing. Application January 17, 1946, Serial No. 641,866

19 Claims. (Cl. 260—84.3)

This invention relates to the polymerization of unsaturated organic compounds capable of undergoing an addition polymerization to form high molecular weight polymers. In one of its more specific aspects it relates to the polymerization of an aliphatic conjugated diene hydrocarbon, including substituted derivatives, either alone or in admixture with a monomer copolymerizable therewith, to form long chain polymers of the type known as synthetic rubbers. In a still more specific aspect it relates to the polymerization of a butadiene-1,3 hydrocarbon and a monomer copolymerizable therewith in an aqueous dispersion in the presence of an improved initiator for the polymerization reaction. The present invention provides new compounds useful as initiators (catalysts) and modifiers for the polymerization of unsaturated organic compounds either alone or in admixture with one another, and particularly in an aqueous dispersion, which compounds form an important part of the present invention.

Unsaturated organic compounds capable of undergoing an addition polymerization to form high molecular weight polymers may be advantageously polymerized in accordance with the present invention either in a homogeneous system or in the form of an aqueous emulsion. Such unsaturated organic compounds are generally those which contain a methylene group attached by an olefinic double bond to a carbon atom in the structure $CH_2=C<$. Compounds which contain the $CH_2=C<$ group and are suitable as monomers for use in the process of our invention include the following: butadiene-1,3; its homologues and analogues which polymerize in the same manner, e. g., isoprene, piperylene, chloroprene, etc.; styrene; acrylonitrile; methyl acrylate; methyl methacrylate; vinyl chloride; etc. These unsaturated organic compounds are given by way of example only. The unsaturated organic compounds may be polymerized alone or in admixture with other monomers copolymerizable therewith.

A number of unsaturated organic compounds are capable of undergoing addition polymerization reactions to form high molecular weight, linear polymers known in the art as synthetic rubbers. Among the more important synthetic rubbers at the present time are those which result from the copolymerization of an aliphatic conjugated diene hydrocarbon and a monomer copolymerizable therewith in an aqueous emulsion. The aliphatic conjugated diene hydrocarbons (or butadiene hydrocarbons) include butadiene-1,3, isoprene, dimethyl butadiene, piperylene, chloroprene, and the like. Monomers copolymerizable with the aliphatic conjugated dienes in aqueous emulsion systems include aryl olefins and substituted aryl olefins (e. g., styrene, p-chloro styrene, p-methoxy styrene, vinyl naphthalene, and the like), alkyl esters of acrylic acids (e. g., methyl acrylate, methyl methacrylate, butyl acrylate, and the like), nitriles of acrylic acids (e. g., acrylonitrile, methacrylonitrile, and the like), vinylidine chloride, vinyl ketones (e. g., methyl vinyl ketone), vinyl ethers, vinyl carbazole, vinyl furan, vinyl pyridine, and the like, all of which contain the $CH_2=C<$ group.

An object of this invention is to provide an improved process for the addition polymerization of unsaturated organic compounds to form high molecular weight polymers. Another object is to provide an improved process for the polymerization of aliphatic conjugated diene hydrocarbons. Another object is to provide an improved process for the copolymerization of a butadiene hydrocarbon and a monomer copolymerizable therewith in an aqueous emulsion. Still another object of this invention is to provide improved initiators or catalysts for use in polymerization reactions of this type. A further object of this invention is to provide compounds particularly suited as initiators and modifiers in the emulsion polymerization of polymerizable organic compounds. A still further object is to provide improved high molecular weight polymers of unsaturated organic monomers. An important object of this invention is to provide an emulsion polymerization process in which a novel initiator is employed to effect a reduction in the time required for carrying out polymerization reactions of this type.

In accordance with the present invention, polymerization of a polymerizable organic monomeric material, either alone or in admixture with a monomer copolymerizable therewith, is carried out in the presence of a diazo thio-ether. The polymerziation may be carried out either in a homogeneous system, as is more specifically disclosed and claimed in copending application Serial No. 8,735, filed February 16, 1948, or in a heterogeneous sytem, for example, in an aqueous dispersion or emulsion. It is preferred to carry out the polymerization in an aqueous emulsion. The term "emulsion" as used herein is to be construed in its broadest sense, that is, as denoting the presence of an aqueous phase and an oil phase without regard to the extent of dispersion of one in the other. In general, emulsion polymerization is carried out in an aqueous dispersion, i. e., the monomers are dispersed in water, usually with the aid of a dispersing or emulsifying agent and agitation. Emulsifying agents which are suitable for this purpose include partially or completely neutralized fatty acid soaps, sodium lauryl sulfate, sodium isobutyl naphthalene sulfonate, sulfated and sulfonated succinic esters, and the like.

The diazo thio-ethers of the present invention have the general structural formula:

$$R-N=N-S-R'$$

where R is a member of the group consisting of the aromatic and substituted aromatic radicals and R' is a member of the group consisting of the aromatic, substituted aromatic, cycloalkyl, substituted cycloalkyl, aliphatic, and substituted aliphatic radicals. These diazo thio-ethers may be made by the combination of a diazotized aromatic amine and an aromatic, cycloalkyl or aliphatic mercaptan, including substituted derivatives.

Examples of aromatic amines which may be used in the preparation of diazo thio-ethers are as follows: aniline, chloroaniline, bromoaniline, toluidine, anisidine, phenetidine, 4-aminodiphenyl ether, toluidine, dimethoxy aniline, nitroaniline, methyl-methoxy aniline, trimethyl aniline, dichloroaniline, xylidine, chlorotoluidine, naphthylamine, dianisidine, benzidine, dichlorobenzidine, sulfanilic acid, aminobenzoic acid, toluidine sulfonic acid, naphthylamine sulfonic acid, and benzidine disulfonic acid. Examples of mercaptans that may be used as a coupling component in the preparation of diazo thio-ethers are the following: thio-phenol, thio-cresol, chloro thio-phenol, methoxy thio-phenol, thio-salicyclic acid, thio-phenol sulfonic acid, thio-naphthol, 2-mercapto-3-naphthoic acid, thio-glycollic acid, ethyl mercaptan, butyl mercaptan, t-butyl mercaptan, cyclohexyl mercaptan, mercapto benzothiazole, and octyl mercaptan.

The diazo thio-ethers preferred for use as polymerization catalysts in accordance with the present invention are those in which both R and R' in the foregoing structural formula are aromatic or substituted aromatic groups. Examples of preferred compounds are substituted phenyl diazo thio-(naphthyl) ethers, phenyl diazo thio-(phenyl) ethers, naphthyl diazo thio-(phenyl) ethers, and naphthyl diazo thio-(naphthyl) ethers. Preferred substituent groups are the alkyl, alkoxy, aryloxy (e. g., phenoxy), carboxy, sulfo ($SO_3H$), halo, and nitro groups. Other substituents give diazo thio-ethers of varying degrees of usefulness.

The diazo thio-ethers can conveniently be prepared by diazotizing an aromatic amine and coupling the diazonium compound with an aliphatic or an aromatic mercaptan. Diazo thio-ethers containing two diazo thio-ether groupings can be prepared by tetrazotizing an aromatic diamine and coupling the tetrazonium compound with two molecular equivalents of a mercaptan. The coupling to the mercaptan is usually carried out in a strongly alkaline medium although in some examples it is advantageous to carry out the coupling in weakly acidic media. The crude diazo thio-ethers isolated from the coupling are usually of sufficient purity for use in polymerization reactions. However, if a purified product is desired the oil-soluble types may be purified by dissolving in acetone or anhydrous ether at about 10° C., cooling to about −50° C. and filtering off the recrystallized product. The water-soluble type diazo thio-ethers, in the form of their ammonium or alkali metal salts (resulting from coupling in an alkaline medium), can be conveniently purified by washing with anhydrous ether.

New compounds prepared in accordance with this invention which are preferred catalysts for the polymerization process of this invention are those represented by the formula $$Ar-N=N-S-R'$$
$$|$$
$$(X)_n$$

where Ar is an aryl group and X is a substituent selected from the group consisting of alkyl, alkoxy, aryl and aryloxy radicals, $n$ is an integer from one to four, $n$ being at least two when a methyl radical is a substituent; and R' is a member of the group consisting of aromatic, substituted aromatic, cycloalkyl, substituted cycloalkyl, aliphatic, and substituted aliphatic radicals. When a methyl substituent is employed in the aryl group attached to the nitrogen at least one other methyl (or other alkyl), alkoxy, aryl, or aryloxy radical is also present. Specific examples of new compounds forming a part of our invention are the following: p-methoxy phenyl diazo thio-(2-naphthyl) ether, dimethyl phenyl diazo thio-(2-naphthyl) ether, dimethyl phenyl diazo thio-(p-methoxy phenyl) ether, p-methoxy phenyl diazo thio-(o-carboxy phenyl) ether, p-sulfo phenyl diazo thio-(2-naphthyl) ether, p-sulfo phenyl diazo thio-(p-tolyl) ether, 2-naphthyl diazo thio-(carboxy phenyl) ether, and the like, together with the ammonium and alkali metal salts of such compounds. Some of the more important new compounds may be conveniently represented by the formula

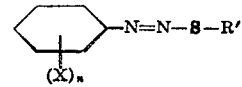

where X is a substituent selected from the group consisting of alkoxy and aryloxy radicals, $n$ is an integer from one to four, and R' is a member of the group consisting of aromatic, substituted aromatic, cycloalkyl, substituted cycloalkyl, aliphatic, and substituted aliphatic radicals.

Conventional practice in emulsion polymerizations has been to add together a monomer or mixture of monomers capable of being polymerized, one or more of various initiators, catalysts, and modifiers, water and an emulsifying agent. The initiator used generally is either an organic peroxide or an inorganic peroxide material, usually used in combination with a modifying agent such as a mercaptan. In one commonly used system a water-soluble oxidant such as potassium persulfate is used in conjunction with an oil-soluble mercaptan which according to theory is oxidized, possibly in the aqueous or soap phase to a mercaptan free-radical, which initiates polymer chain growth by combining with a monomer unit. There are certain inherent defects in such a chain initiation system; and furthermore, the use of an oxidant such as potassium persulfate may have certain undesirable features inasmuch as the oxidant is likely to enter into certain undesirable side reactions.

We have now discovered that the defects of the above described system, which nevertheless is the best system previously known, can be largely overcome through the use of diazo thio-ethers as polymerization initiators. Furthermore the diazo thio-ethers have the great advantage of functioning also as modifiers of chain growth, thus making it possible to control the molecular weight and properties of the polymer without the use of additional modifiers. However, it is sometimes advantageous to use supplementary modifiers in addition to the diazo thio-ether.

Although the exact mechanism of chain initiation by diazo thio-ethers is not known it is possible that the chains are initiated by free radicals formed by decomposition of the diazo thio-ether. Free radicals can be formed, for example, according to the following reaction:

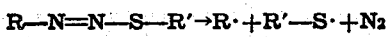

Either or both of the above free radicals might then initiate polymer chain growth by reacting with a monomer unit according to reactions such as the following:

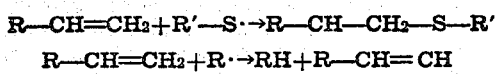

The mechanism of the chain-transfer function of the diazo thio-ethers is likewise not clearly understood. The chain-transfer may be brought about by mercaptans generated by decomposition of the diazo thio-ether. However, it may also be that the diazo thio-ether, itself, is a chain-transfer agent according to either or both of the following reactions where $R^{2}\cdot$ represents a growing polymer molecule:

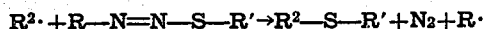
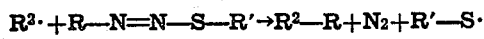

According to this mechanism the free radicals $R\cdot$ and $R'—S\cdot$ may then react with new monomer thus initiating new polymer chains.

The theory set forth above is a possible explanation of the mechanism involved in the function of diazo thio-ethers of our invention in emulsion polymerization reactions. This theory is included herein only as an aid in understanding the present invention and is not to be construed as in any way limiting the invention. Regardless of the mechanism postulated, the fact remains that the diazo thio-ethers effectively catalyze and modify emulsion polymerization reactions.

One of the greatest advantages of the use of diazo thio-ethers in polymerization reactions in accordance with our invention is their great versatility. Diazo thio-ethers of almost any desired reactivity can be prepared by suitably varying the radicals R and R'. For example, if R and R' are both aromatic radicals, diazo thio-ethers of great activity can be obtained if either or both of the radicals contain activating substituents, for example, alkyl or alkoxy groups. If low-activity initiators are desired for polymerization reactions at higher temperatures the radicals R and R' can contain deactivating substituents, for example, chloro or nitro groupings. When R' is aliphatic, diazo thio-ethers of high activity are obtained. Considerable variation in this high activity can be obtained by varying the substituents on the aromatic radical R.

The diazo thio-ethers are still more versatile as polymerization promoters since they may be oil soluble or water soluble as desired. In order to prepare water soluble diazo thio-ethers it is only necessary that either or both of the radicals R or R' contain a water solubilizing substituent, for example, the carboxylic or sulfonic acid groups or other hydrophilic groups. Such water soluble diazo thio-ethers are conveniently prepared and used in the form of their ammonium or alkali metal salts. In general the initiator activity of the water soluble diazo thio-ethers may be said to be somewhat greater than that of comparable oil soluble diazo thio-ethers. However, both types appear to be of similar efficiency as polymerization modifiers.

The type and amount of diazo thio-ether used in a particular polymerization recipe depends upon the result desired. For polymerizations to be carried out at low temperatures (e. g., −10 to 40° C.) an active diazo thio-ether is chosen. The water soluble types are particularly satisfactory for low-tempertaure recipes. In carrying out polymerization in an aqueous emulsion at a temperature below the freezing point of the aqueous phase, an inert freezing point depressant is employed. For polymerizations to be carried out at higher temperatures (e. g., 40°–60° C.) diazo thio-ethers of moderate activity are chosen while for even higher temperature polymerizations diazo thio-ethers of low activity are selected. In general, approximately 0.2 part by weight of the diazo thio-ether, based on the weight of the monomeric material, will give satisfactory promotion although other proportions within the range of about 0.05 to about 5.0 parts by weight, based on 100 parts by weight of the monomeric material, may be used. The diazo thio-ether may be added in increments throughout the polymerization reaction in order to provide more uniform modification and to obtain more efficient utilization of the diazo thio-ether. If the diazo thio-ether is used alone to modify the molecular weight of the polymer somewhat larger quantities are needed than is the case if other modifiers are used in conjunction therewith. It is often desirable to add an auxiliary modifier such as a dodecyl mercaptan to the polymerization recipe.

Typical examples of our invention are the following:

Example I 123 parts of p-anisidine are dissolved in 3,000 parts of water with 91 parts of hydrogen chloride (100%) used as a 36% solution. The resulting solution is cooled to 0 to 5° C. and diazotized by the addition of 70 parts of sodium nitrite dissolved in 200 parts of water. The diazonium solution is poured rapidly into a solution of 163 parts of thio-beta-naphthol and 400 parts of sodium hydroxide in 4,500 parts of water at 0 to 5° C. The diazo thio-ether, p-methoxy phenyl diazo thio-(2-naphthyl) ether, immediately precipitates as a finely dispersed oil, which soon solidifies to a yellow solid. The solid material is filtered off, washed thoroughly, and dried at room temperature under vacuum. This thio-ether is oil soluble.

Two parts of the diazo thio-ether are added to an agitated autoclave containing water 180 parts, soap 5 parts, butadiene 75 parts, and styrene 25 parts. Agitation is continued for nine hours while the charge temperature is maintained at 50° C. by means of water circulation in the autoclave jacket. At the end of nine hours the charge is discharged into a stripping tank where the unreacted monomers are recovered by steam distillation. The latex is creamed by the addition of a small amount of sodium chloride solution and coagulated by the addition of dilute sulfuric acid. The rubber crumb is washed several times by decantation and, finally, dried in a vacuum oven at 60° C. The product, which is thus obtained in about 80% conversion based upon the weight of starting monomers, is a soft, well-modified rubber which is soluble in benzene and has good properties when compounded and vulcanized in conventional ways.

Example II 145 parts of beta-naphthylamine are diazotized in 2,000 parts of water containing 250 parts of 10 N hydrochloric acid by the addition of a solution of 70 parts of sodium nitrite. The resulting diazonium solution is run slowly into a solution of 162 parts of thio-salicylic acid in 10,000 parts of water containing 80 parts of sodium hydroxide and 410 parts of sodium carbonate. The sodium salt of beta-naphthyl diazo thio-salicylic acid precipitates and is filtered and washed thoroughly with 10% sodium sulfate solution and, finally, once with a small amount of cold water. The product, 2-naphthyl diazo thio-(carboxy phenyl) ether, is dried at room temperature under vacuum. If desired it can be purified by washing with a little anhydrous ethyl ether. The resulting product is of the water soluble type.

When used in a polymerization recipe essentially as described in Example I, the results are comparable to those of Example I.

Example III 173 parts of sulfanilic acid are diazotizes in 2,000 parts of water containing 25 parts of 10 N hydrochloric acid by the addition of a solution of 70 parts of sodium nitrite. The cold diazonium solution is poured rapidly into a cold solution of 131 parts of p-thio-cresol in 5,000 parts of water containing 80 parts of sodium hydroxide and 82 parts of sodium acetate. The bright, yellow sodium salt of the diazo thio-ether precipitates immediately and is isolated, washed, and dried as in Example II. This product, p-sulfo phenyl diazo thio-(p-tolyl) ether, is of the water soluble type.

One part of the diazo thio-ether is added to a polymerization mixture containing 180 parts of water, 5 parts of Aerosol AY (a commercial, synthetic detergent described as a succinic ester sulfonate), 75 parts of butadiene, and 25 parts of styrene. Polymerization is carried out at 50° C. for 12 hours and the rubber isolated by methods analogous to those of Example I.

Example IV

Two parts of the diazo thio-ether prepared by coupling diazotized p-anisidine with thio-salicylic acid, p-methoxy phenyl diazo thio-(carboxy phenyl) ether, (a diazo thio-ether of the water soluble type), are added to a polymerization recipe containing 180 parts of water, 5 parts of Aerosol AY, 75 parts of butadiene, and 25 parts of styrene. Polymerization is carried out at 25° C. for twelve hours and the product isolated as in Example I. A well modified rubber of good properties is obtained.

Example V 0.3 part of the diazo thio-ether of Example I is added to a polymerization recipe containing 180 parts of water, 5 parts of soap, 0.4 part of dodecyl mercaptan, 75 parts of butadiene and 25 parts of styrene. Polymerization is continued for 12 hours at 50° C. and the product isolated as in Example I. A well modified rubber of good properties is obtained.

Example VI 0.3 part of the diazo thio-ether of Example I is added to a polymerization recipe containing 180 parts of water, 5 parts of soap, 0.2 part of potassium persulfate, 0.4 part of tertiary dodecyl mercaptan, 75 parts of butadiene, and 25 parts of styrene. Polymerization is continued for 10 hours and the rubber isolated as in Example I.

Example VII

An autoclave is charged exactly as in Example I except that isoprene is used in place of the butadiene. A comparable rubber of very good properties is obtained.

Example VIII

Two parts of the diazo thio-ether of Example I are added to a polymerization mixture of water 180 parts, soap 5 parts, butadiene 75 parts and methyl methacrylate 25 parts. Polymerization proceeds rapidly at 50° C. to give an elastomer having certain very desirable properties.

Example IX

One part of the diazo thio-ether of Example I is added to 100 parts of ethyl acrylate. The solution is run slowly into an agitated autoclave containing 150 parts of water and one part of Aerosol AY, the batch temperature being maintained at 50° C. An acrylic polymer of valuable properties is obtained.

Example X

One part of the oil soluble diazo thio-ether, p-chloro phenyl diazo thio-(2-naphthyl) ether, prepared by coupling diazotized p-chloroaniline with thio-beta-naphthol, is dissolved in 100 parts of methyl methacrylate and polymerized as in Example IX. A methacrylate polymer of valuable properties is obtained.

Example XI

Two parts of the diazo thio-ether of Example I are added to a polymerization recipe of 180 parts of water, 5 parts of soap, 70 parts of butadiene and 30 parts of acrylonitrile. Polymerization is carried out at 50° C. and the product isolated as in Example I.

Example XII

A polymerization is carried out exactly as in Example I except that vinyl pyridine is used in place of styrene. A well modified rubber of good properties is obtained.

Example XIII

A polymerization is carried out exactly as in Example I except that dichlorostyrene is used in place of styrene. A well modified rubber of good properties is obtained.

Example XIV

Two parts of the diazo thio-ether prepared in Example I are added to a polymerization mixture consisting of 180 parts of water, 5 parts of dodecyl amonium acetate, 75 parts of butadiene and 25 parts of styrene. Polymerization is carried out at 40° C. The stripped latex is coagulated, isolated and dried in the usual way.

Example XV 0.5 part of the diazo thio-ether, dimethyl phenyl diazo thio(2-naphthyl) ether, prepared by coupling diazotized m-xylidine with thio-beta-naphthol is added to a polymerization mixture containing 180 parts of water, 5 parts of soap, 75 parts of butadiene and 25 parts of styrene.

Polymerization is carried out at 50° C. for 3 hours to obtain a 65% conversion of a soft, well-modified rubber of good properties. When the diazo thio-ether was replaced by 0.3 part of potassium persulfate and 0.5 part of dodecyl mercaptan in the above recipe, ten hours were required to effect the same amount of conversion.

*Example XVI*

The polymerization of Example I was carried out in which a total of 0.75 part of the diazo thio-ether was added in increments as the polymerization proceeded. 0 05 part of the promoter was added at the beginning of the reaction, 0.3 part was added at the end of one hour and 0.4 part was added at the end of four hours. Polymerization conversion was 75% in seven hours at 50° C. The rubber was completely soluble in benzene and had very good properties. This increment manner of addition was found to decrease materially the proportion of diazo thio-ether required while providing uniform modifying action.

The foregoing examples illustrate preferred methods of practicing this invention and are to be construed as being illustrative only, without in any way limiting the scope of the invention.

An important advantage of the process of this invention and the catalysts employed therewith is illustrated in the examples illustrating the use of diazo thio-ethers of both the oil-soluble and the water-soluble types. The choice of the diazo thio-ether also affects the rate of polymerization as is illustrated in the examples. Catalysts of our invention may be employed to effect very rapid polymerization of the monomeric materials, if desired, and make possible continuous emulsion polymerization in lieu of the conventional batch process. Another important advantage of the process of this invention and the catalysts employed therein is that emulsion polymerization may be carried out using recipes containing less soap than is necessary for conventional emulsion polymerization. This results in a polymer of low residual soap content and of improved quality (for certain uses).

The rubbers produced by the methods of the present invention are found to have excellent properties when evaluated in comparison with standard synthetic rubbers in conventional compounding recipes. Standard tread stocks prepared from polymers made in accordance with the present invention have room temperature tensile strengths in the range of 3000 to 3500 pounds per square inch or more and room temperature elongations in the range of 600 to 800 per cent or more. Other properties such as hysteresis, flex life, abrasion resistance, etc., of the products of the present invention in many cases possess definite superiority over polymers produced by conventional methods.

Although we have disclosed specific embodiments of our invention, it will be apparent that the initiators and polymerization process of our invention are capable of broad application in the art, and that various modifications may be made without departing from the scope of the invention.

We claim:

1. In a process of polymerizing by addition polymerization an ethylenically unsaturated polymerizable organic compound to form a high molecular weight linear polymer, the step which comprises polymerizing said unsaturated organic compound in aqueous dispersion in the presence of a diazo thio-ether of the formula $$R-N=N-S-R'$$

where R is a member of the class consisting of aromatic radicals, and R' is a member of the class consisting of aromatic, cycloalkyl, and aliphatic radicals.

2. The process of claim 1 wherein said polymerization is effected in the presence of 0.05 to 5 parts by weight, based on 100 parts by weight of said unsaturated organic compound, of such a diazo thio-ether.

3. The process of claim 1 wherein a diazo thio-ether is added at the start of said polymerization and also at least once during the course of the polymerization reaction.

4. The method which comprises polymerizing in aqueous dispersion a polymerizable unsaturated monomeric material comprising an aliphatic conjugated diene containing a $CH_2=C<$ group and which undergoes an addition polymerization to form a high molecular weight linear polymer in the presence of a diazo thio-ether of the formula $R-N=N-S-R'$ where R is a member of the class consisting of aromatic radicals, and R' is a member of the class consisting of aromatic, cyclo-alkyl, and aliphatic radicals.

5. The method which comprises copolymerizing in an aqueous dispersion a conjugated diene hydrocarbon and an organic ethylenically unsaturated monomer copolymerizable therewith in an aqueous dispersion in the presence of a diazo thio-ether of the formula $R-N=N-S-R'$ where R is a member of the class consisting of aromatic radicals and R' is a member of the class consisting of aromatic, cyclo-alkyl, and aliphatic radicals.

6. The method which comprises copolymerizing in an aqueous dispersion butadiene-1,3 and an organic ethylenically unsaturated monomer copolymerizable therewith in an aqueous dispersion in the presence of a diazo thio-ether of the formula $R-N=N-S-R'$ where R is a member of the class consisting of aromatic radicals and R' is a member of the class consisting of aromatic, cyclo-alkyl, and aliphatic radicals.

7. The method which comprises polymerizing a hydrocarbon monomeric material comprising a major portion of butadiene-1,3, and a vinyl aromatic hydrocarbon in an aqueous dispersion in the presence of 0.05 to 5.0 parts by weight on the basis of the monomers of a diazo thio-ether of the formula $R-N=N-S-R'$ where R is a member of the class consisting of aromatic radicals and R' is a member of the class consisting of aromatic, cyclo-alkyl, and aliphatic radicals.

8. The method which comprises copolymerizing in an aqueous emulsion butadiene-1,3 with an organic ethylenically unsaturated monomer copolymerizable therewith in an aqueous emulsion in the presence of p-methoxy phenyl diazo thio-(2-napthyl) ether.

9. The method as defined in claim 8 wherein said comonomer is styrene.

10. The method which comprises copolymerizing in an aqueous emulsion butadiene-1,3 with an organic ethylenically unsaturated monomer copolymerizable therewith in an aqueous emulsion in the presence of dimethyl phenyl diazo thio-(2-naphthyl) ether.

11. The method which comprises copolymerizing in an aqueous emulsion butadiene-1,3 with an organic ethylenically unsaturated monomer copolymerizable therewith in an aqueous emulsion in the presence of p-methoxy phenyl diazo thio-(carboxy phenyl) ether.

12. The process of making a polymeric synthetic rubber, which comprises copolymerizing in aqueous emulsion at a polymerization temperature between —10 and 60° C. a liquid monomeric material comprising a major portion of butadiene-1,3 and a minor portion of styrene in the presence of 0.05 to 5 parts by weight, based on 100 parts by weight of said monomeric material, of p-methoxy phenyl diazo thio-(2-naphthyl) ether, and recovering a resulting polymeric synthetic rubber so produced.

13. The process of making a polymeric synthetic rubber, which comprises copolymerizing in aqueous emulsion at a polymerization temperature between —10 and 60° C. a liquid monomeric material comprising a major portion of a butadiene-1,3 and a minor portion of an organic ethylenically unsaturated monomer copolymerizable therewith in aqueous emulsion in the presence of 0.05 to 5 parts by weight, based on 100 parts by weight of said monomeric material, of p-methoxy phenyl diazo thio-(2-naphthyl) ether, and recovering a resulting polymeric synthetic rubber so produced.

14. The process of making a polymeric synthetic rubber, which comprises copolymerizing in aqueous emulsion at a polymerization temperature a liquid monomeric material comprising a butadiene-1,3 in the presence of 0.05 to 5 parts by weight, based on 100 parts by weight of said monomeric material, of p-methoxy phenyl diazo thio-(2-naphthyl) ether, and recovering a resulting polymeric synthetic rubber so produced.

15. In a process of polymerizing in aqueous emulsion a liquid monomeric mixture containing butadiene-1,3 and styrene, the step which comprises adding p-methoxy phenyl diazo thio-(2-naphthyl) ether to the monomeric mixture before polymerization and subsequently effecting a copolymerization of said butadiene-1,3 and styrene.

16. The process of making a polymeric synthetic rubber, which comprises copolymerizing in aqueous emulsion at a polymerization temperature between —10 and 60° C. a liquid monomeric material comprising a major portion of butadiene-1,3 and a minor portion of styrene in the presence of 0.05 to 5 parts by weight, based on 100 parts by weight of said monomeric material, of a p-methoxy phenyl diazo thio-(naphthyl) ether, and recovering a resulting polymeric synthetic rubber so produced.

17. The process of making a polymeric synthetic rubber, which comprises copolymerizing in aqueous emulsion at a polymerization temperature between —10 and 60° C. a liquid monomeric material comprising a major portion of butadiene-1,3 and a minor portion of styrene in the presence of 0.05 to 5 parts by weight, based on 100 parts by weight of said monomeric material, of a phenyl diazo thio-(aryl) ether, and recovering a resulting polymeric synthetic rubber so produced.

18. In a process of emulsion polymerizing an aliphatic conjugated diene in aqueous emulsion, the step of conducting said polymerization in the presence of p-methoxy phenyl diazo thio-(2-naphthyl) ether in an amount between 0.05 and 5 parts by weight, based on 100 parts of said monomeric material.

19. In a process of emulsion polymerizing an aliphatic conjugated diene in aqueous emulsion, the step of conducting said polymerization in the presence of a diazo thio-ether in an amount between 0.05 and 5 parts by weight, based on 100 parts of said monomeric material, said diazo thio-ether having the formula R—N=N—S—R' where R is an aromatic radical and R' is an organic radical selected from the group consisting of aromatic cycloalkyl, and aliphatic radicals.

WILLIAM B. REYNOLDS.
ERNEST W. COTTEN.

REFERENCES CITED

The following references are of record in the file of this patent:

UNITED STATES PATENTS

| Number | Name | Date |
|---|---|---|
| 1,975,409 | Schnitzspan | Oct. 2, 1934 |
| 2,251,156 | Nygard | July 29, 1941 |
| 2,313,233 | Fryling | Mar. 9, 1943 |
| 2,376,963 | Garvey | May 29, 1945 |
| 2,380,473 | Stewart | July 31, 1945 |